Patented Sept. 19, 1933

1,927,375

UNITED STATES PATENT OFFICE 1,927,375

HARDENING OF CONDENSATION PRODUCTS FROM PHENOLS AND ALDEHYDES

Fritz Schmidt, Troisdorf, near Cologne-on-the-Rhine, Germany

No Drawing. Application December 21, 1928, Serial No. 327,754, and in Germany January 23, 1928

2 Claims. (Cl. 260—4)

It has already been known for some time to add acids to condensation products of phenols and aldehydes after condensation has begun, but prior to complete hardening, for the purpose of accelerating the hardening process, thus causing polymerization to the hard insoluble end product. As a result of the thickening of the liquid condensation products which occurs during this polymerization and continuously increases, it becomes extremely difficult or impossible to stir the mass, more especially under practical conditions and when working with large masses of resin. Consequently the further hardening of the resin which is already dehydrated to a considerable extent in the distillation vessel has hitherto been allowed to proceed by itself, which involves important drawbacks.

With very small amounts of acid the hardening takes an extremely long time and larger quantities of acid do not come into question owing to the known drawbacks involved (blistering etc.); in addition more particularly with larger quantities of resin there is not a sufficient balance of heat in the resin, the more so the further the viscosity progresses. This defective equalization of heat naturally causes an entirely non-uniform hardening, that is to say the hardening takes place from outside inwards or also from inside outwards, according to the nature and strength of the acid employed and according to the hardening temperature employed. The result is that non-uniform products are obtained, which are in parts overhardened and in parts still sticky, so that a further treatment for instance on rollers or in cutting presses is impossible and even pressing to form moulded portions is made very difficult owing to the danger of sticking in the moulds. Naturally the quality of the end products made therefrom also suffers quite considerably by this non-uniform hardening.

The invention consists in carrying out this treatment of the condensation products which are still liquid while hot, with as small quantities as possible of acid or acid-acting substances, with all particles continuously renewing contact with one another and a thorough exchange of heat throughout. This hardening treatment may be carried out in a kneading apparatus, in order to effect the polymerization and further dehydration therein in a perfectly uniform manner in spite of increasing viscosity, while continuously mixing the mass, if desired with moderate heating. The mass then, in a much shorter time than in hardening by itself, obtains a viscous, plastic nature, which is distinguished by complete or almost complete lack of adhesiveness. The mass can now either be allowed to cool, in which case it becomes so hard, that it can be ground, without soiling the mill, and pressed bodies of any desired kind, as well as plates, can be produced under pressure and heat from the powder—if desired after it has been previously compreessed to form slabs—. By previously colouring the powder, as desired, and suitably distributing different coloured powders in the pressure mould it is also possible with this method of working to obtain designs of every possible colour. Finer effects are obtained however by placing the mass which has become almost or completely non-sticky, on rollers and tinting and mixing there in the manner sufficiently well-known for celluloid-like masses, in order thereupon either to press them directly in moulds under pressure and heat to form plates or moulded articles, or also to draw them in rod or tube presses while still cold or moderately warm, to form rods or tubes, which can then be further hardened merely by heating; if desired however portions can also be cut off from the rods after the drawing operation and these portions then pressed under pressure and heat to form buttons, counters and the like.

The important technical advance obtained by the present method consists therefore, (1) in a striking acceleration of the hardening of the condensation products, caused by as small quantities as possible of acid or acid-acting substances, in kneading apparatus, which is due to the thorough and continually renewed contact of all particles, (2) through the latter a complete equalization of heat is ensured even with large masses in a perfectly viscous plastic state, that is to say with exclusion of any local overheating, so that in a well-defined readily distinguishable phase, the entire mass loses its stickiness and can then be treated without any difficulty on rollers and in presses of all kinds similarly to celluloid. Finally the further dehydration takes place naturally during this hardening process in a perfectly uniform manner, as all particles come to the surface of the mass with the same frequency.

In this way products of particularly good mechanical and electrical properties are obtained.

*Example*

50 kgs. phenol are condensed with 100 kgs. of a 30% solution of formaldehyde with the addition of 2 kgs. caustic soda in the usual way, the excess alkali neutralized with acid, for instance hydrochloric acid and dehydration carried out in a vacuum, until the mass can be drawn off in a warm condition still liquid from the distillation vessel. Thereupon it is poured into a kneading machine, a small excess of acid, for instance 2% phosphoric acid or oxalic acid added, kneaded for say 5-6 hours at about 40-50° C. until the mass becomes quite viscous and finally plastic and has wholly or practically lost its stickiness. The mass is then rolled, coloured in various parts on the roller, mixed there and the rolled mass compressed in stage presses under pressure and heat to form plates or in rod presses in the cold to form rods, which are subsequently further hardened merely by heating. Or the cooled, kneaded mass is converted to powder, then ground and pressed bodies of any desired kind moulded from the powder.

Having now particularly described and ascertained the nature of my said invention and in what manner the same is to be performed, I declare that what I claim is:—

1. A method of hardening condensation products of phenols and aldehydes, containing at most not more than small amounts of filling materials, consisting in adding to the said condensation products while still liquid and hot a slight excess of an acid of the group consisting of phosphoric acids and oxalic acid, causing the said products to harden further with continuously renewing contact and thorough exchange of heat by all particles in kneading apparatus, until at least an almost completely non-adhesive state is reached, treating the resulting products without intermission in the usual manner by pressure and heat.

2. A method of hardening a condensation product of phenol and formaldehyde, obtainable by condensing 50 parts of phenol with 100 parts of a 30% solution of formaldehyde with the addition of 2 parts of caustic soda in the usual way, neutralizing the excess alkali with an acid and dehydrating the mass, which method comprises adding to the said condensation product while still liquid and hot about 2% of an acid of the group consisting of phosphoric acid and oxalic acid, causing the condensation product to harden further with continuously renewing contact and thorough exchange of heat by all particles by kneading it thoroughly at about 40 to 50° C., until the mass becomes plastic and has lost its stickiness, and treating the resulting product without intermission in the usual maner by pressure and heat.

FRITZ SCHMIDT.